US008025445B2

(12) United States Patent
Rambow et al.

(10) Patent No.: US 8,025,445 B2
(45) Date of Patent: Sep. 27, 2011

(54) METHOD OF DEPLOYMENT FOR REAL TIME CASING IMAGING

(75) Inventors: Frederick Henry Kreisler Rambow, Houston, TX (US); Brad W. Davis, Clear Lake, IA (US); Brooks Childers, Christiansburg, VA (US); Travis Hall, Blacksburg, VA (US); Phillip Edward Abshire, Lafayette, LA (US)

(73) Assignee: Baker Hughes Incorporated, Houston, TX (US)

( * ) Notice: Subject to any disclaimer, the term of this patent is extended or adjusted under 35 U.S.C. 154(b) by 320 days.

(21) Appl. No.: 12/474,412

(22) Filed: May 29, 2009

(65) Prior Publication Data

US 2010/0303427 A1 Dec. 2, 2010

(51) Int. Cl.
*G02B 6/255* (2006.01)
*G02B 6/00* (2006.01)

(52) U.S. Cl. ....................................... 385/95; 385/147

(58) Field of Classification Search .................... 385/95, 385/96, 97, 98, 99, 147, 133, 134, 135; 174/88 R, 174/76, 91, 93; 702/14, 16; 73/653, 152.16
See application file for complete search history.

(56) References Cited

U.S. PATENT DOCUMENTS 3,856,414 A * 12/1974 Menary ......................... 356/430
4,805,979 A 2/1989 Bossard et al.
4,958,903 A 9/1990 Cobb et al.
5,247,603 A * 9/1993 Vidacovich et al. .......... 385/135
6,571,046 B1 5/2003 Hickey et al.
6,888,972 B2 * 5/2005 Berg et al. ....................... 385/12
7,063,145 B2 6/2006 Veenstra et al.
7,077,199 B2 7/2006 Vinegar et al.
7,114,566 B2 10/2006 Vinegar et al.
7,128,153 B2 10/2006 Vinegar et al.
7,156,176 B2 1/2007 Vinegar et al.
7,159,653 B2 1/2007 Vold
7,165,615 B2 1/2007 Vinegar et al.

(Continued)

FOREIGN PATENT DOCUMENTS

EP 0493796 A1 12/1991
WO 02063130 A1 8/2002

OTHER PUBLICATIONS

Notification of Transmittal of the International Search Report of the International Searching Authority, or the Declaration; PCT/US2010/034738; Jan. 24, 2011.

(Continued)

*Primary Examiner* — Akm Ullah
(74) *Attorney, Agent, or Firm* — Cantor Colburn LLP

(57) ABSTRACT

A method for imaging a structure disposed in a borehole penetrating the earth, the method including: selecting a splice housing having a first port configured to seal the housing to a first fiber optic cable and a second port configured to seal the housing to a fiber optic sensor configured to image the structure, wherein the housing includes a sealed interior volume sufficient to contain a splice of optical fibers for protection and to enable a functional bend of at least ninety degrees for at least one spliced optical fiber; disposing a splice between an optical fiber of the first fiber optic cable and an optical fiber of the fiber optic sensor in the splice housing; disposing the splice housing containing the splice in the borehole; attaching the fiber optic sensor to the structure; and disposing the structure in the borehole after the splice housing is disposed in the borehole.

23 Claims, 5 Drawing Sheets

U.S. PATENT DOCUMENTS

| | | | | |
|---|---|---|---|---|
| 7,225,866 | B2 | 6/2007 | Berchenko et al. | |
| 7,254,999 | B2 * | 8/2007 | Bostick, III | 73/152.16 |
| 7,360,588 | B2 | 4/2008 | Vinegar et al. | |
| 7,405,358 | B2 | 7/2008 | Emerson | |
| 2007/0209799 | A1 | 9/2007 | Vinegar et al. | |
| 2007/0280619 | A1 | 12/2007 | Conner et al. | |
| 2007/0283761 | A1 * | 12/2007 | Bostick, III | 73/653 |

OTHER PUBLICATIONS

Cornish, B., et al., "Next-Generation Multisensor Seismic-While-Drilling Technology," IADC/SPE 99042 Drilling Conference, Feb. 21-23, 2006, Miami, Florida, USA.

Drakeley, B.K., et al., "In-Well Optical Sensing-State-of-the-Art Applications and Future Direction for Increasing Value in Production-Optimization Systems," SPE 99696. Intelligent Energy Conference and Exhibition, Apr. 11-13, 2006, Amsterdam, The Netherlands.

Islam, M.R., "Title Emerging Technologies in Subsurface Monitoring of Petroleum Reservoirs," SPE 69440. Latin American and Caribbean Petroleum Engineering Conference, Mar. 25-28, 2001, Buenos Aires, Argentina.

Kluth, E.L.E., "Advanced Sensor Infrastructure for Real Time Reservoir Monitoring," SPE 65152 European Petroleum Conference, Oct. 24-25, 2000, Paris, France.

Kragas, T.K., et al., "The Optic Oil Field: Deployment and Application of Permanent In-well Fiber Optic Sensing Systems for Production and Reservoir Monitoring," SPE 71529 Annual Technical Conference and Exhibition, Sep. 30-Oct. 3, 2001, New Orleans, Louisiana.

Smith, B., et al., "Field-Wide Deployment of In-Well Optical Flowmeters and Pressure/Temperature Gauges at Buzzard Field," SPE 112127 Intelligent Energy Conference and Exhibition, Feb. 25-27, 2008, Amsterdam, The Netherlands.

* cited by examiner

10
UPHOLE
DOWNHOLE
14
21
28
20
25
24
R
22
23
27
26

12
13
21
20

10
28
21
20

B
B
21
20

METHOD OF DEPLOYMENT FOR REAL TIME CASING IMAGING

BACKGROUND OF THE INVENTION

1. Field of the Invention

The invention disclosed herein relates to method and apparatus for imaging a structure downhole and, in particular, to imaging using a fiber optic sensor.

2. Description of the Related Art

Hydrocarbons are generally recovered through boreholes penetrating reservoirs of the hydrocarbons. Various types of structures may be disposed in the boreholes for the recovery process. During well completion, one type of structure known as a casing or tubular is disposed in a borehole. The casing, similar to a pipe, is used to contain the hydrocarbons flowing to the surface of the earth for recovery.

Structures such as casings disposed in boreholes can be exposed to harsh environments. The harsh environments include high temperature, high pressure, and high stress. The high stress can result from the high temperature, the high pressure, high loads or high vibration. Because of the high cost of well completion, it is important to monitor the downhole environment and strains experienced by the downhole structures to prevent damage.

Monitoring the downhole environment and the downhole structures requires both a communication medium and sensors that are able to withstand a harsh environment. Optical fibers disposed in cables known as a fiber optic cable are used as the communication medium and as sensors in the borehole because the fiber optics have characteristics which make them suitable to withstand the harsh environment encountered in the borehole.

Because more than one fiber optic sensor may be used in one borehole, splices are required to couple each fiber optic sensor to an assigned optical fiber in a fiber optic communication cable. While fiber optics may be able to withstand the pressures and temperatures of the harsh downhole environment, fiber optics are delicate and require careful and precise installation especially when installing the splices. Unfortunately, installing the splices on the floor of a completion rig is not conducive to the care and precision required for a reliable and working installation.

Another problem can arise when a faulty sensor is first inserted into the borehole before a splice is made coupling the sensor to the fiber optic communication cable. In this case, the faulty sensor can be far down the borehole before the fault is detected resulting in wasted time to remove the sensor from the borehole for repair or replacement. This is especially true when the sensor is a fiber optic with embedded fiber Bragg gratings used for real time casing imaging (RTCI).

In RTCI, the fiber optic with the embedded fiber Bragg gratings is wrapped around a section of the casing in a spiral shape. The fiber optic is then epoxied in place and sometimes wrapped in tape. Thus, much time is required for a custom installation, and the rework time to repair or replace a faulty RTCI fiber optic sensor can be considerable.

The sensor is typically inserted into the borehole before the splice because the conventional splice housing is an "upside-down Y" having one uphole leg and two downhole legs. The uphole leg is connected to a fiber optic cable leading to the surface of the earth. The two downhole legs are generally connected to different sensors.

Therefore, what are needed are techniques for deploying a fiber optic communication cable and a fiber optic strain sensor in a borehole. Preferably, the techniques enable testing the strain sensor prior to the strain sensor being inserted into the borehole.

BRIEF SUMMARY OF THE INVENTION

Disclosed is a method for imaging a structure disposed in a borehole penetrating the earth, the method including: selecting a splice housing configured to be disposed in the borehole and having a first port configured to seal the housing to a first fiber optic cable and a second port configured to seal the housing to a fiber optic sensor configured to image the structure, wherein the housing includes a sealed interior volume sufficient to contain a splice of optical fibers for protection and to enable a functional bend of at least ninety degrees for at least one spliced optical fiber; disposing a splice between an optical fiber of the first fiber optic cable and an optical fiber of the fiber optic sensor in the splice housing; disposing the splice housing containing the splice in the borehole; attaching the fiber optic sensor to the structure; and disposing the structure in the borehole after the splice housing is disposed in the borehole.

Also disclosed is an apparatus for imaging a structure disposed in a borehole penetrating the earth, the apparatus including: a fiber optic sensor configured to image the structure; a first fiber optic cable having an optical fiber configured to be spliced to the fiber optic sensor; and a splice housing configured to be disposed in the borehole and having a first port configured to seal the housing to the first fiber optic cable and a second port configured to seal the housing to the fiber optic sensor, wherein the housing comprises a sealed interior volume sufficient to contain a splice of optical fibers from the fiber optic sensor and the first fiber optic cable for protection and to enable a functional bend of at least ninety degrees for at least one spliced optical fiber.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
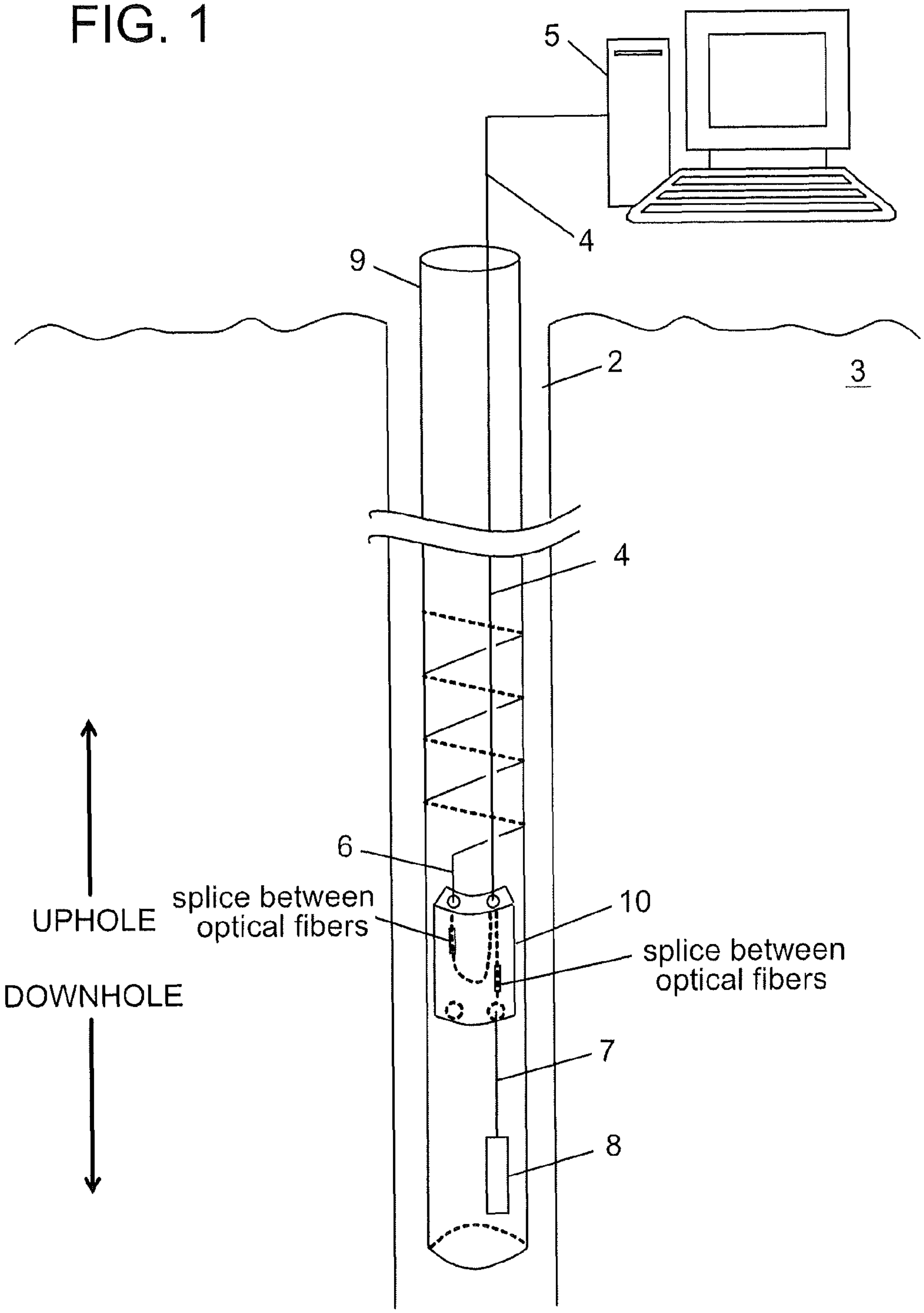
FIG. 1 illustrates an exemplary embodiment of a fiber optic sensor disposed in a borehole penetrating the earth.

Disclosed are exemplary embodiments of techniques for deploying a fiber optic communications cable and a fiber optic strain sensor (or any fiber optic sensor) in a borehole penetrating the earth. The fiber optic strain sensor is configured to be in optical communication with a fiber optic processing unit via the fiber optic communications cable. Because the strain sensor is separate from the fiber optic communications cable, a splice is required to couple the fiber optic strain sensor to an assigned optical fiber in the fiber optic communications cable. The techniques, which include method and apparatus, call for installing the splice below the strain sensor such that the splice is disposed in the borehole before the strain sensor. In this manner, the fiber optic strain sensor can be tested or made operational before being disposed in the borehole.

The techniques disclosed herein use an optical fiber splice housing for protecting the splice between two optical fibers from a harsh environment downhole. In one embodiment, the splice housing includes two ports oriented in an uphole direction and two ports oriented in a downhole direction. Each port is configured to seal a fiber optic cable entering the housing. In general, sealing is accomplished by using threaded connections having at least one ferrule to seal the cable to the ferrule and to seal the ferrule to the splice housing.

To protect the splice of optical fibers downhole, the optical fiber splice housing is watertight, vacuum resistant, and pressure resistant to at least 10,000 psi.

For convenience, certain definitions are presented. The term "downhole" relates to at least one of being located in a borehole and a direction leading to deeper or further in the borehole. A downhole direction relates to any direction having a directional component pointing downhole. The term "uphole" relates to a direction from within a borehole leading to the entrance of the borehole. An uphole direction relates to any direction having a directional component pointing uphole.

The term "fiber optic cable" relates to a cable containing one or more optical fibers that are configured for transmitting a light such as a light signal. The fiber optic cable in general is protected from a borehole environment by an outer covering, which can include an armored jacket. A fiber optic cable leading from or integral with an instrument may contain only one optical fiber for communicating a light signal. The term "stripped optical fiber" relates to an optical fiber with no outer covering or armored jacket or an optical fiber having a jacket enclosing only that optical fiber, i.e., an optical fiber stripped from an armored jacket and any coverings of the armored jacket.

The term "instrument" relates to any sensor or gauge used for measuring a property of a borehole environment, a formation, or a structure or apparatus disposed in a borehole. Non-limiting examples of measured properties include pressure, temperature, displacement, acceleration, gravity, force, stress, strain, speed, flow and chemical.

The splice housing has sufficient volume to contain a splice between two optical fibers. The splice can be a fusion splice, a mechanical splice, or any type of splice known in the art. The splice housing also has sufficient volume to allow an optical fiber stripped from the outer covering of the fiber optic cable to make a bend from at least ninety (90) degrees to over 180 degrees without violating the minimum required bend radius of the optical fiber to remain functional. To this end, the splice housing includes one or more cylindrical posts each having a radius that meets or exceeds at least the minimum bend radius. In addition, the splice housing has sufficient volume to store in a controlled manner excess lengths of optical fibers that were stripped from the outer covering of the fiber optic cable. In general, the storage of the excess lengths of the stripped optical fibers is controlled by wrapping the excess lengths of the stripped optical fibers around the one or more cylindrical posts. Thus, the posts provide for routing of the stripped optical fibers at either end of the splice to an appropriate port for connection to another fiber optic cable. In one embodiment, the excess length of a stripped optical fiber to be stored can be at least two feet.

The interior of the splice housing is accessed through an opening sealed by a splice housing lid. In one embodiment, the splice housing lid is secured and sealed to the splice housing by a plurality of cap screws and a double o-ring seal. The splice housing with the splice housing lid in place provides an environment protected from the borehole environment for splices and excess stripped fiber optic cable.

The dimensions of the splice housing are small enough to allow attaching the splice housing to the side of a casing that will be disposed in a borehole without subjecting the housing to damage from the borehole wall. Further protection may be provided by shielding the housing with a protector configured to clamp to the casing above and below the housing. The protector covers the housing with a shield disposed between the clamps.

Reference may now be had to FIG. 1. FIG. 1 illustrates an exemplary embodiment of a splice housing 10 attached to a casing 9 disposed in a borehole 2 penetrating the earth 3. Connected to the splice housing 10 is a first fiber optic cable 4 connected to a fiber optic processing unit 5, a fiber optic strain sensor 6, and a second fiber optic cable 7 connected to an instrument 8. The first fiber optic cable 4 extends uphole from the housing 10 to the processing unit 5. The processing unit 5 is configured to interrogate the strain sensor 6 with light to perform strain measurements. The fiber optic strain sensor 6 extends uphole from the housing 10. The second fiber optic cable 7 extends downhole from the housing 10 to an instrument 8. The instrument 8 can be any sensor or gauge configured to perform a measurement (such as pressure or temperature for example) downhole. In one embodiment, the second fiber optic cable 7 is integral with the instrument 8.

In the embodiment of FIG. 1, the fiber optic strain sensor 6 is wrapped around the casing 9 in a spiral fashion. The strain sensor 6 is configured to measure a strain at the casing 9 at various points along the strain sensor 6. The process of measuring the strains experienced by the casing 9 may be referred to as real time casing imaging. While the discussion relates to measuring strains experienced by the casing 9, the strain sensor 6 can be used to "image" other downhole structures. In one embodiment, the fiber optic strain sensor 6 includes an optical fiber having a plurality of etched fiber Bragg gratings used to measure the strain of the casing 9 to which the strain sensor 6 is attached. Thus, as the spacing between refractive index changes of each grating changes in response to a strain, a measurement of the spacing can be related to the strain at the various points. A measurement in a change of the frequency of light reflected by a grating is generally used as a measure of the change in spacing between the refractive index changes of the grating.

In another embodiment, other splice housings 10 can be used to splice other instruments or communications/processing apparatus to a fiber optic cable extending further downhole. Thus, several of the housings 10 can be coupled in series to the casing 9 to break out optical fibers to nearby instruments as needed.

Figures 2A, 2B, 2C, 2D:
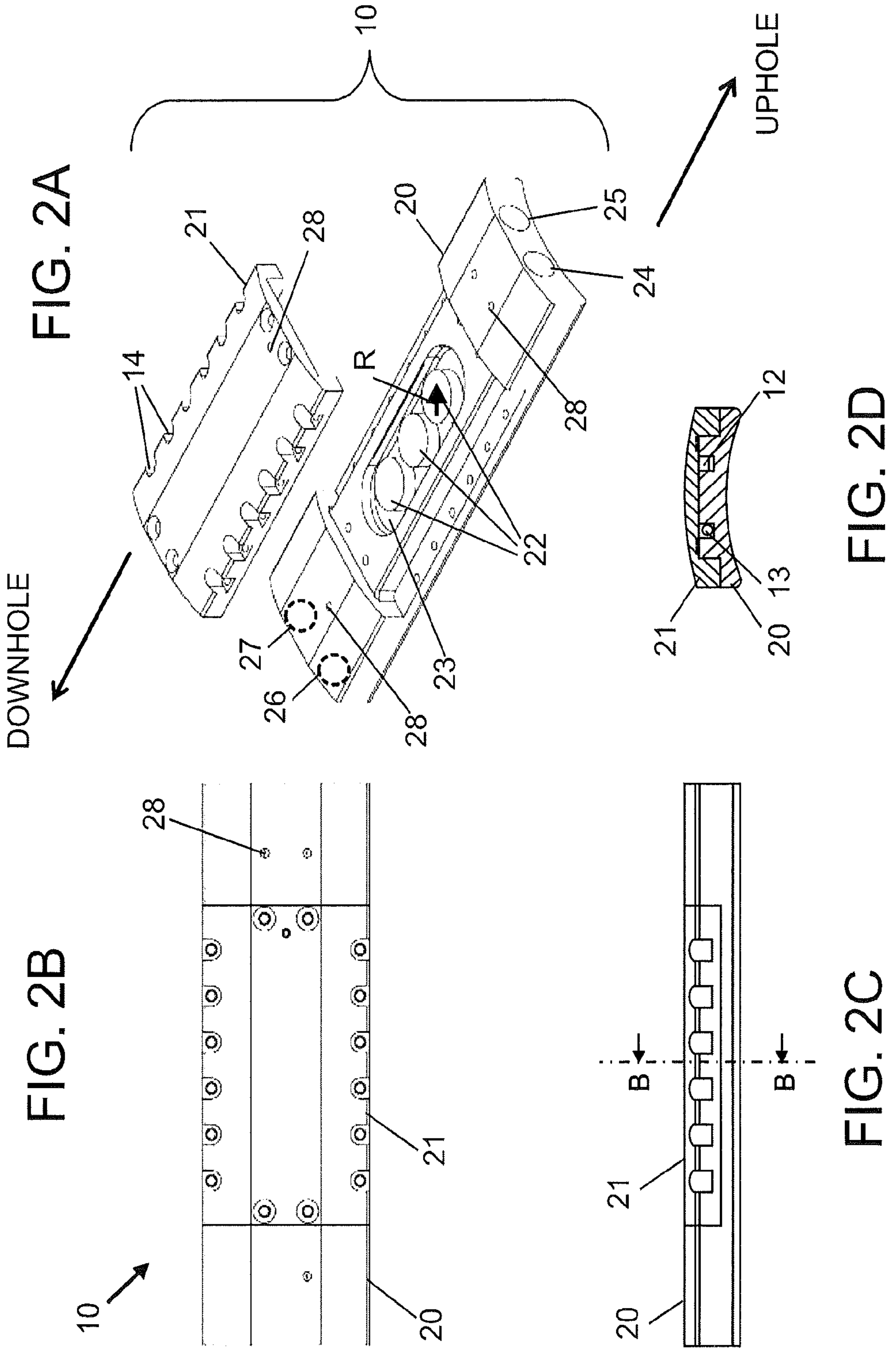
FIGS. 2A, 2B, 2C and 2D, collectively referred to as FIG. 2 depict aspects of a fiber optic splice housing

Reference may now be had to FIG. 2. FIG. 2 depicts aspects of the splice housing 10. Referring to FIG. 2A, the splice housing 10 includes a housing body 20 and a housing lid 21. The housing lid 21 is configured to mate to the housing body 20 to seal an interior volume 23 from the external environment. The interior volume 23 is large enough to contain at least two splices between stripped optical fibers and enable a functional bend of at least ninety (90) degrees and, in general, up to 180 degrees (or 360 degrees for storing excess lengths of stripped optical fibers). In addition, the interior volume 23 is large enough to contain excess length of the stripped optical fibers to enable many tries at splicing should a splice fail without resorting to removing any of the fiber optic cables 4 and 7 and the sensor 6 from the splice housing 10 to remove more of the armored jacket. The housing body 20 includes ports 24, 25, 26 and 27 so that fiber optic cables (such as the first fiber optic cable 4, the second fiber optic cable 7, and the fiber optic strain sensor 6) can be connected and sealed to the interior 23. Ports 24 and 25 are oriented in an uphole direction and ports 26 and 27 oriented in a downhole direction. The ports 24 and 25 can also be described as being oriented about 180 degrees from the ports 26 and 27.

Still referring to FIG. 2A, the housing lid 21 includes a plurality of recesses 14 to protect the cap screws securing the lid 21 to the housing body 20.

Still referring to FIG. 2A, the splice housing includes a plurality of test ports 28. Each test port 28 can be used to pressure test the housing 10 for leakage. The pressure test can include increasing or decreasing the pressure internal to the housing 10 and monitoring the pressure for a change that would indicate leakage. Each test port 28 is configured to be sealed with a plug after completion of testing.

Still referring to FIG. 2A, disposed in the interior 23 are three fiber management posts 22 each having a radius, R. The radius R is at least the minimum bend radius that the stripped optical fibers can withstand and remain functional. The fiber management posts 22 can be used to wrap the excess length of any stripped optical fibers and can be used to change direction of spliced optical fibers to lead to one of the ports. As one example, each post 22 can be used to coil the excess length of different stripped optical fibers.

FIG. 2B illustrates a top view of the splice housing 10 with the housing lid 21 installed on the housing body 20. FIG. 2C illustrates a side view of the splice housing 10 with the housing lid 21 installed on the housing body 20. FIG. 2D illustrates a cross-sectional view of the splice housing 10 with the housing lid 21 installed on the housing body 20. Referring to FIG. 2D, the housing body 20 includes a groove 12 configured to contain a first O-ring 13 for sealing the lid 21 to the body 20.

As shown in FIGS. 2A and 2D, the lower portion of the housing body 20 is curved to conform to the curvature of the casing 9. The curvature of the housing body 20 allows for a close fit to the casing 9 when the splice housing 10 is clamped to the casing 9. The close fit helps to prevent interference with the wall ofthe borehole 2.

Figure 3:
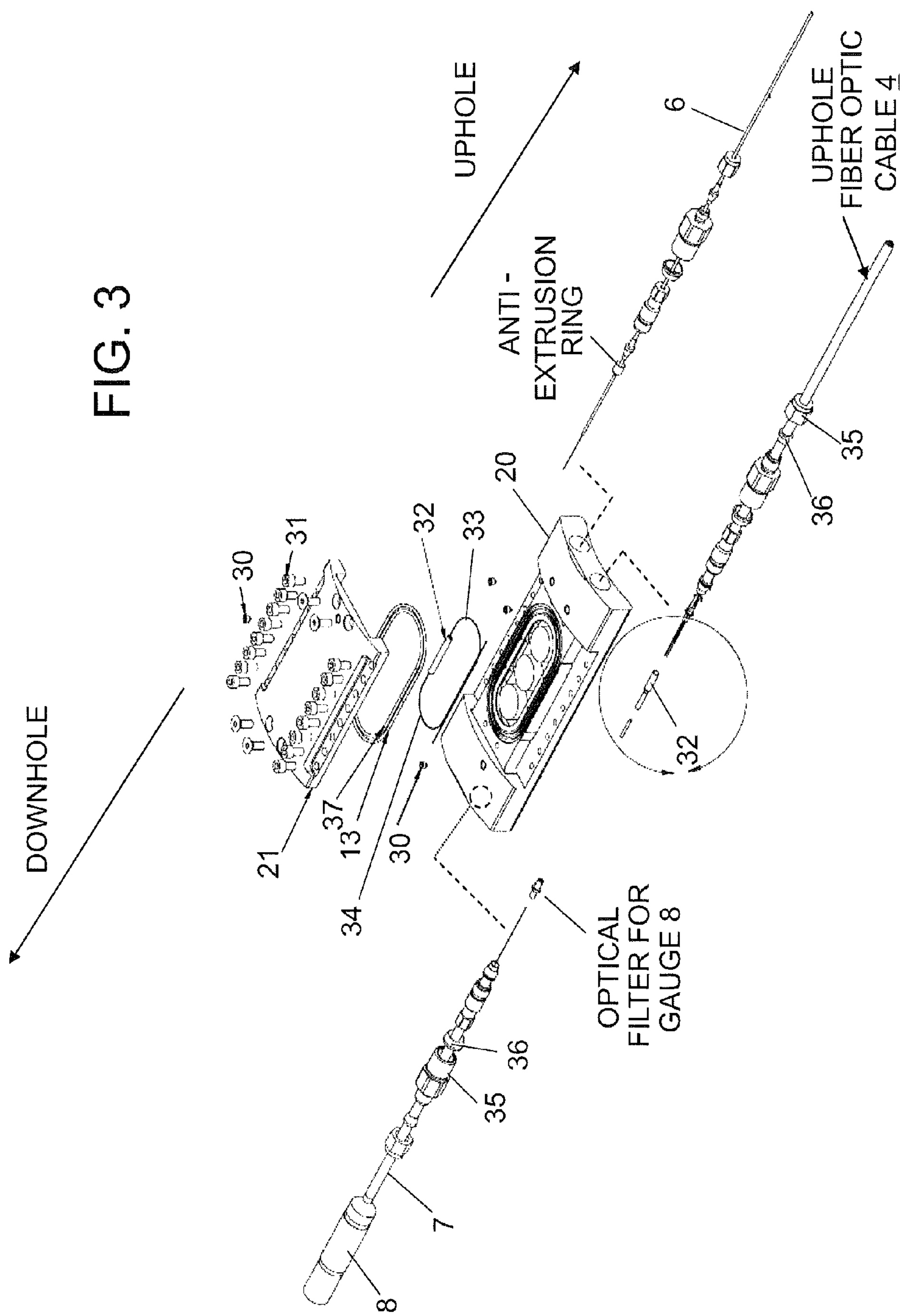
FIG. 3 depicts aspects of fiber optic cable connections to the fiber optic housing.

FIG. 3 illustrates an exploded view of the splice housing 10 with the first fiber optic cable 4, the fiber optic strain sensor 6, and the second fiber optic cable 7 connected to the instrument 8.

Referring to FIG. 3, FIG. 3 depicts a plurality of test port plugs 30 used to seal the test ports 28. Also depicted in FIG. 3 is a plurality of cap screws 31 used to secure the housing lid 21 to the housing body 20. Also depicted in FIG. 3 is an inner O-ring 37 that provides added sealing protection between the housing body 20 and the housing lid 21. Also depicted in FIG. 3 is a splice protector sleeve 32 used to cover and protect a splice between optical fibers 33 and 34 contained within the splice housing 10. Also depicted in FIG. 3 are threaded fittings 35 and ferrules 36 used to seal the first fiber optic cable 4, the fiber optic strain sensor 6, and the second fiber optic cable 7 to the housing body 20.

Figure 4:
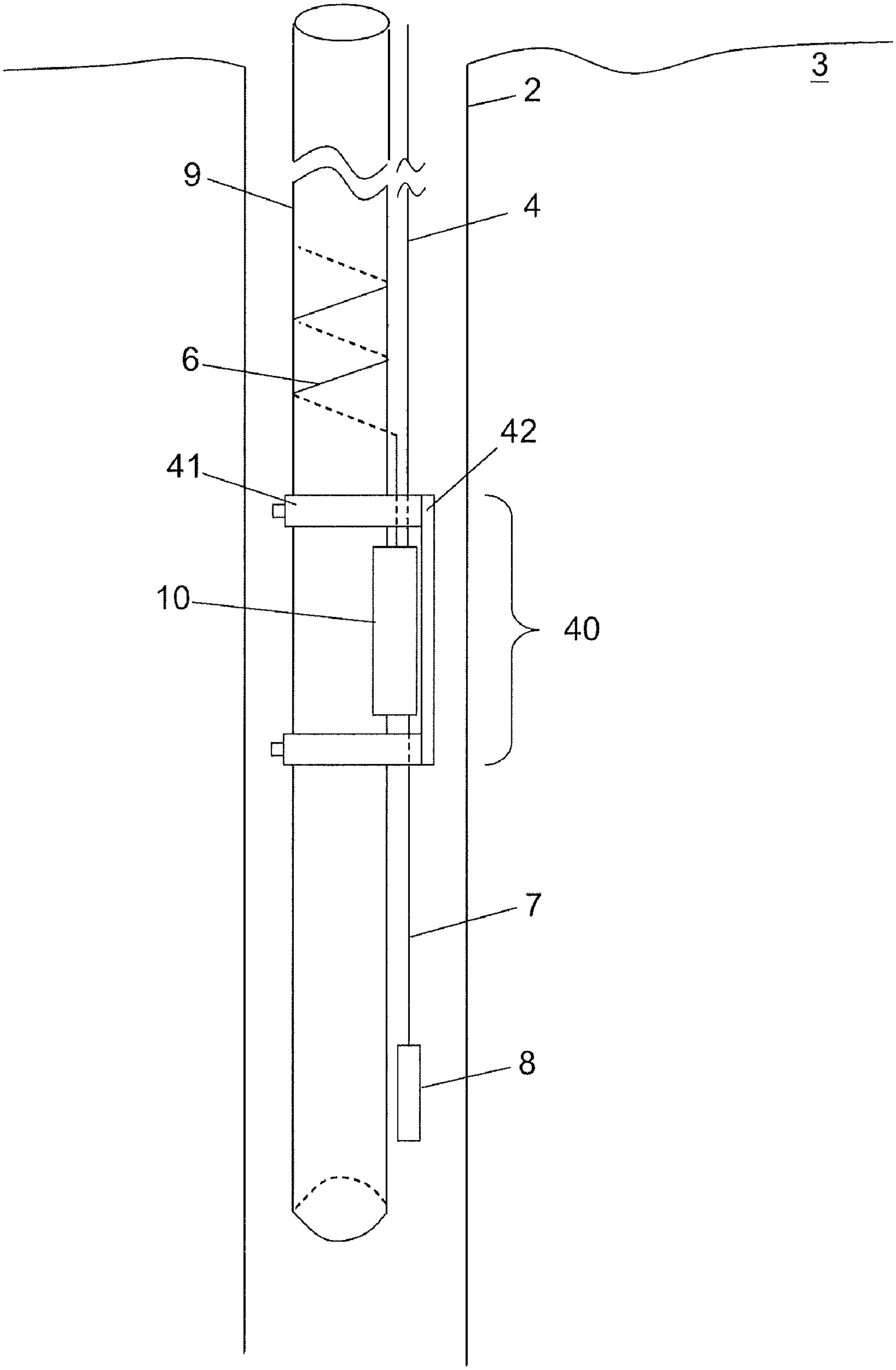
FIG. 4 illustrates a side view of an exemplary embodiment of the fiber optic splice housing secured to a casing by a protector.

FIG. 4 illustrates a side view of an exemplary embodiment of the fiber optic splice housing 10 secured to the casing 9 by a protector 40. The protector 40 includes a clamp 41 for attaching a shield 42 to the casing 9. The splice housing 10, in turn, is secured to the casing 9 by the shield 42. The shield 42 shields the splice housing 10 from contact with a wall ofthe borehole 2.

Figure 5:
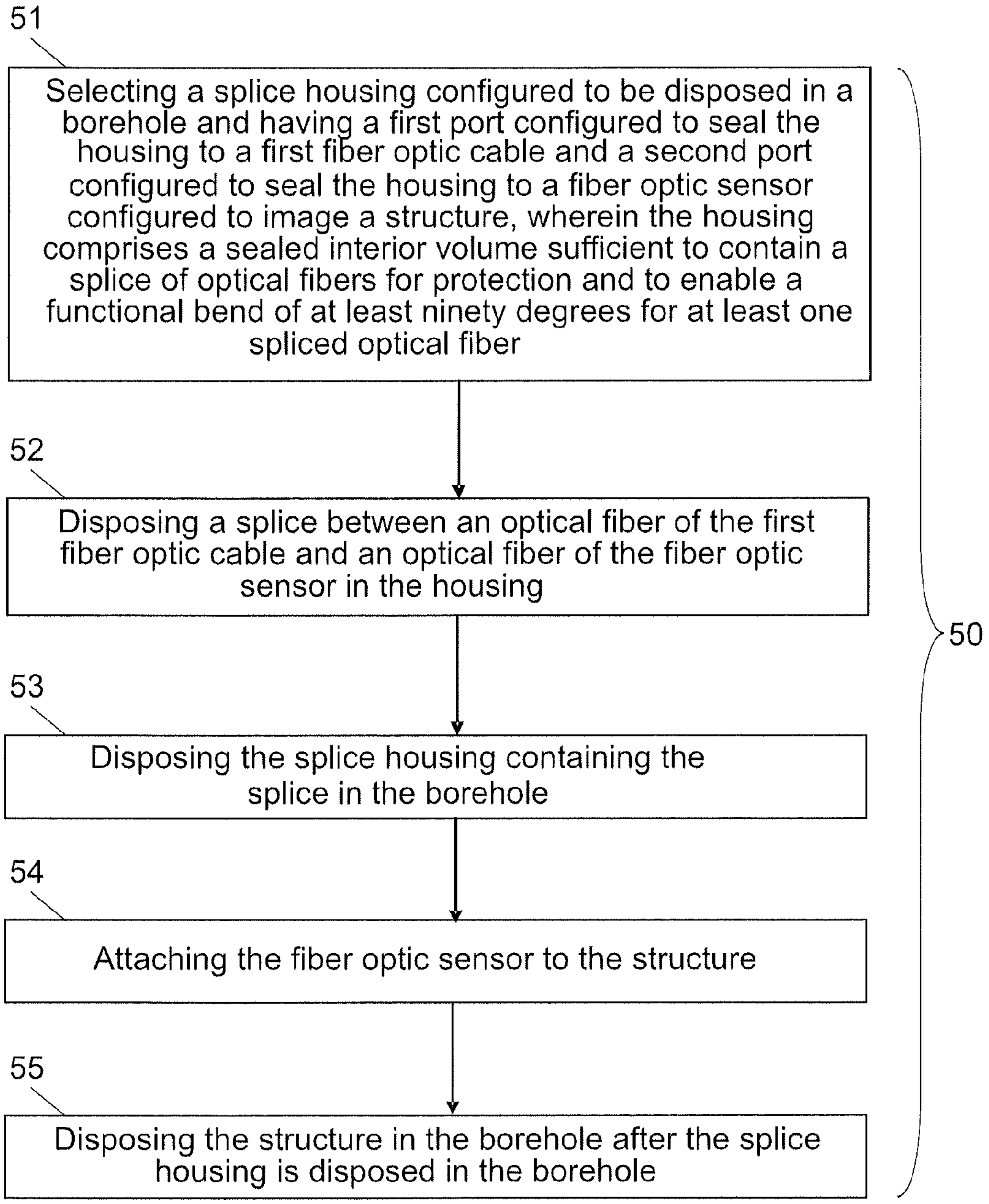
FIG. 5 presents one example of a method for imaging a structure disposed in the borehole.

FIG. 5 presents one example of a method 50 for deploying the fiber optic strain sensor 6 in the borehole 2 penetrating the earth 3. The method 50 calls for (step 51) selecting the housing 10. Further, the method 50 calls for (step 52) disposing a splice between the fiber optic strain sensor 6 and an optical fiber of the first fiber optic cable 4 in the splice housing 10. Further, the method 50 calls for (step 53) disposing the splice housing 10 in the borehole 2. Further, the method 50 calls for (step 54) attaching the fiber optic strain sensor 6 to a structure (i.e., the casing 9). Further, the method 50 calls for (step 55) disposing the structure in the borehole 2.

The method 50 can also include attaching the splice housing 10 to the structure. The attaching can be by way of the protector 40 discussed above. The method 50 can also include testing the fiber optic strain sensor 6 prior to the sensor 6 being disposed in the borehole 2. The method 50 can also include disposing in the splice housing 10 an instrument splice between an optical fiber in the second fiber optic cable 7 connected to the instrument 8 and an assigned optical fiber in the first fiber optic cable 4.

Various other components may be included and called upon for providing aspects of the teachings herein. For example, a bracket for mounting the housing 10 to the casing 9, a power supply (e.g., at least one of a generator, a remote supply and a battery), cooling component, heating component, sensor, instrument component, gauge, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for imaging a structure disposed in a borehole penetrating the earth, the method comprising:

selecting a splice housing configured to be disposed in the borehole and comprising a first port configured to seal the housing to a first fiber optic cable and a second port configured to seal the housing to a fiber optic sensor configured to image the structure, wherein the housing comprises a sealed interior volume sufficient to contain a splice of optical fibers for protection and to enable a functional bend of at least ninety degrees for at least one spliced optical fiber;

disposing a splice between an optical fiber of the first fiber optic cable and an optical fiber of the fiber optic sensor in the splice housing;

disposing the splice housing containing the splice in the borehole;

attaching the fiber optic sensor to the structure; and disposing the structure in the borehole after the splice housing is disposed in the borehole.

2. The method of claim 1, wherein the imaging comprises determining a strain.

3. The method of claim 2, wherein the fiber optic sensor comprises an optical fiber having a fiber Bragg grating configured to measure the strain.

4. The method of claim 1, further comprising testing the fiber optic sensor prior to disposing the structure in the borehole.

5. The method of claim 1, wherein the structure comprises a casing.

6. The method of claim 5, further comprising securing the splice housing to the casing.

7. The method of claim 6, wherein securing comprises placing the splice housing against the casing wherein a curvature of the splice housing conforms to a curvature of the casing.

8. The method of claim 6, wherein securing comprises using a protector to secure the splice housing to the casing, the protector comprising a first clamp disposed uphole of the splice housing, a second clamp disposed downhole of splice housing, and a shield bridging the clamps and configured to protect the splice housing from an environment in the borehole.

9. The method of claim 1, further comprising disposing an instrument in the borehole before disposing the splice housing in the borehole, a second fiber optic cable from the instrument being configured to seal to a third port in the splice housing wherein the third port is oriented in a downhole direction.

10. The method of claim 1, further comprising disposing an instrument splice between an optical fiber from the instrument another optical fiber in the first fiber optic cable in the splice housing.

11. The method of claim 9, further comprising measuring at least one property with the instrument from a group consisting of pressure, temperature, displacement, acceleration, gravity, force, stress, strain, speed, flow and chemical.

12. The method of claim 1, wherein attaching comprises using an epoxy.

13. An apparatus for imaging a structure disposed in a borehole penetrating the earth, the apparatus comprising:

a fiber optic sensor configured to image the structure;

a first fiber optic cable comprising an optical fiber configured to be spliced to the fiber optic sensor; and a splice housing configured to be disposed in the borehole and comprising a first port configured to seal the housing to the first fiber optic cable and a second port configured to seal the housing to the fiber optic sensor, wherein the housing comprises a sealed interior volume sufficient to contain a splice of optical fibers from the fiber optic sensor and the first fiber optic cable for protection and to enable a functional bend of at least ninety degrees for at least one spliced optical fiber.

14. The apparatus of claim 13, wherein the functional bend is at least 135 degrees.

15. The apparatus of claim 14, wherein the functional bend is at least 180 degrees.

16. The apparatus of claim 15, wherein the functional bend is at least 360 degrees.

17. The apparatus of claim 13, wherein the fiber optic sensor comprises an optical fiber having a fiber Bragg grating configured to image the structure.

18. The apparatus of claim 17, wherein the imaging comprises determining a strain.

19. The apparatus of claim 13, further comprising an optical processing unit coupled to the first fiber optic cable and configured to interrogate the fiber optic sensor.

20. The apparatus of claim 13, further comprising an adhesive configured to attach the fiber optic sensor to the structure.

21. The apparatus of claim 13, further comprising an instrument configured to be disposed downhole of the splice housing, a second fiber optic cable from the instrument being configured to seal to a third port in the splice housing wherein the third port is oriented in a downhole direction.

22. The apparatus of claim 21, further comprising an instrument splice between another optical fiber in the first fiber optic cable and an optical fiber from the instrument, wherein the instrument splice is disposed in the splice housing.

23. The apparatus of claim 13, wherein the interior volume is sufficient to store an excess length of each spliced optical fiber.

* * * * *